G. J. HAUK.
GAMBREL.
APPLICATION FILED JULY 14, 1910.

974,881.

Patented Nov. 8, 1910.

Witnesses:
Harry S. Gaither
Ruby V. Brydges

Inventor:
George J. Hauk
by Chamberlin & Freudenreich
attys

UNITED STATES PATENT OFFICE.

GEORGE J. HAUK, OF MOUNT VERNON, INDIANA.

GAMBREL.

974,881.  Specification of Letters Patent.  Patented Nov. 8, 1910.

Application filed July 14, 1910. Serial No. 571,901.

*To all whom it may concern:*

Be it known that I, GEORGE J. HAUK, a citizen of the United States, residing at Mount Vernon, county of Posey, State of Indiana, have invented a certain new and useful Improvement in Gambrels, and declare the following to be a full, clear, and exact description of the same, such as will enable others skilled in the art to which it pertains to make and use the same, reference being had to the accompanying drawings, which form a part of this specification.

My invention has for its object to provide a simple and novel form of gambrel, which may be used for a variety of purposes and operate efficiently under all conditions of use.

Figure 1:
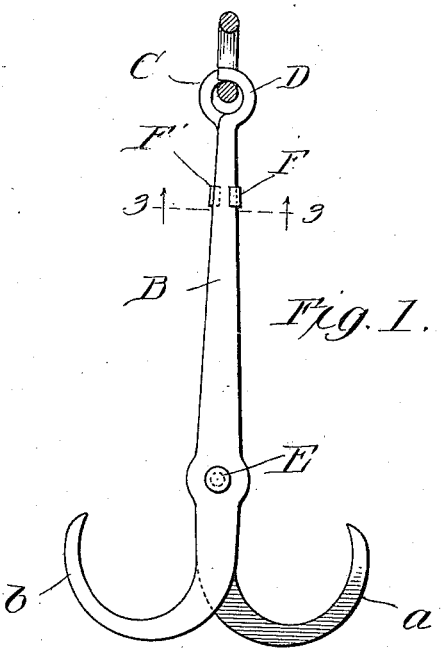
Figure 2:
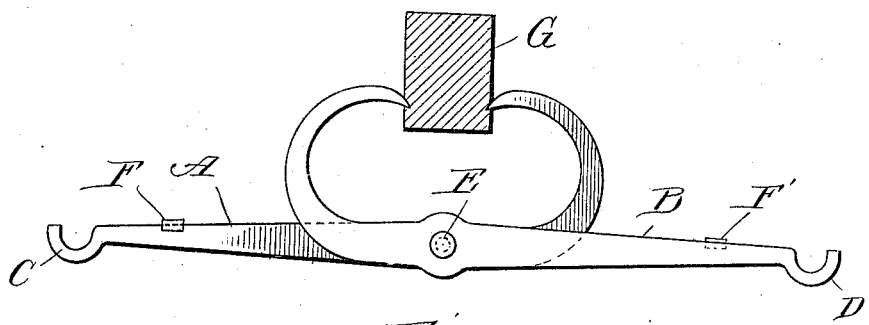
Figure 3:
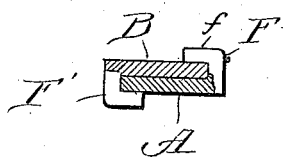

The various features of novelty, whereby my invention is characterized, will hereinafter be pointed out with particularity in the claims; but for a full understanding of my invention and its object and advantages, reference may be had to the following detailed description, taken in connection with the accompanying drawing, wherein:

Figure 1 is a side view of the preferred form of my invention, showing it in what I term its "folded" position; Fig. 2 is a view similar to Fig. 1, showing the device in its extended position; and Fig. 3 is a section on line 3, 3, of Fig. 1, illustrating the stop devices.

Referring to the drawing, A and B represent two similar members, substantially J-shaped in form. The ends of the curved portions, *a* and *b*, are preferably sharpened or pointed. Each of the members is provided at the free end of its stem portion with a small hook, indicated at C and D, respectively. The hook on each member is so located that its mouth is directed toward the side of the stem on which the curved portion of that member lies.

E is a pivot connecting the two members together, preferably adjacent to the points where the curved portions, *a* and *b*, leave the stems. The parts are so proportioned that when the two members are swung so as to bring the two stems side by side, as illustrated in Fig. 1, the hooks C and D form a closed loop at one end of the device, while the parts *a* and *b* form grappling hooks lying on opposite sides of the double stem. I prefer to provide means for preventing the stems from swinging past each other, when moved relatively to each other in one direction, so that when a rod or link is introduced in the loop formed by the members C and D, the two members are locked together and act as a single piece. This may conveniently be accomplished by placing on one of the members a lug or shoulder, as indicated at F, this lug or shoulder projecting laterally so as to engage with the approaching edge of the other member and stop the relative movement when the two hooks have passed each other sufficiently to form a closed loop.

The shoulder or lug may be produced in any suitable way and, if desired, may have a lip *f* which overlies the side of the member which is engaged thereby so as to clamp the two members together. This clamping action may be increased by placing similar lugs or shoulders on both of the members, the lug F being on the member A, and the corresponding lug F' on the member B.

The two members of the device are preferably made of flat iron or steel, suitably shaped so as to give a maximum strength, and the lugs or shoulders are preferably placed upon the stems adjacent to the hooks so as to afford them a long lever arm.

When the device is to be used for dragging a hog from the pen, where it has been killed, it is folded as indicated in Fig. 1 and a clevis or lap-ring is passed through the loop formed by the two hooks, locking the two members together. One of the pointed curved parts is then thrust through the lower jaw of the animal, which may then be drawn away by hitching a horse to the clevis or lap-ring. If desired, a stick or rod may be thrust through the loop so that the hog may be drawn away by hand.

It will be seen that the device may be used as a hay-hook or a grappling hook of any kind when in the condition indicated in Fig. 1. It will also be seen that by slipping the loop over a peg, the two parts, *a* and *b*, may be made to serve as hooks from each of which a quarter of beef, or a half hog, may be suspended.

The device may also be extended as shown in Fig. 2, the parts or jaws, *a* and *b*, being hooked into opposite sides of a suitable support, as indicated at G, this being a pole, rafter, or any other suitable or convenient device. When in this position, the hooks C and D may be used to suspend meat or other things.

In case of emergency, the device may be used as a swingletree when extended as shown in Fig. 2.

While I have illustrated and described in detail only a single preferred form of my invention, I do not desire to be limited to the exact structural details thus illustrated and described, but intend covering all forms and arrangements which fall within the terms employed in the definitions of my invention, constituting the appended claims.

What I claim is:

1. A device of the character described, comprising two reversely-arranged J-shaped members pivotally connected together, each member having at the free end of its stem a hook with its mouth directed toward the side of the stem on which the curved portion of that member lies, and a stop on one of the stems adapted to engage with the other stem on the side opposite the mouth of the hook on the latter stem.

2. A device of the character described, comprising two reversely-arranged J-shaped members pivotally connected together adjacent to the point where the curved portions leave the stems, each of said members having at the free end of its stem a hook with its mouth directed toward the side of the stem on which the curved portion of that stem lies, and a stop on one member engaging with the other member when said members are swung into a position wherein said hooks form a closed loop, said stop having a portion to engage the edge of the other stem opposite the mouth of the hook on that stem and another portion arranged to engage the side of the latter stem.

3. A device of the character described, comprising two reversely-arranged J-shaped members pivotally connected together adjacent to the point where the curved portions leave the stems, each of said members having at the free end of its stem a hook with its mouth directed toward the side of the stem on which the curved portion of that stem lies, and a stop on one member engaging with the other member when said members are swung so as to bring the stems thereof side by side, said stop being so located as to permit the said hooks to swing partially past each other so as to form a closed loop.

In testimony whereof, I sign this specification in the presence of two witnesses.

GEORGE J. HAUK.

Witnesses:
GEORGE A. KALLENBACH,
JOSEPH BUCK.